(12) United States Patent
Hsu

(10) Patent No.: US 8,382,133 B2
(45) Date of Patent: Feb. 26, 2013

(54) FOLDABLE DEVICE FOR CONNECTING A FRONT FORK TO A HANDLEBAR OF A BICYCLE

(75) Inventor: Che-Wei Hsu, Taichung Hsien (TW)

(73) Assignee: Giant Manufacturing Co., Ltd., Taichung Hsien (TW)

( * ) Notice: Subject to any disclaimer, the term of this patent is extended or adjusted under 35 U.S.C. 154(b) by 589 days.

(21) Appl. No.: 12/561,712

(22) Filed: Sep. 17, 2009

(65) Prior Publication Data
US 2010/0207352 A1  Aug. 19, 2010

(30) Foreign Application Priority Data
Feb. 13, 2009  (TW) .............................. 98104671 A

(51) Int. Cl.
*B62K 15/00* (2006.01)
*B62K 21/12* (2006.01)
*B62K 21/16* (2006.01)
(52) U.S. Cl. .................... 280/278; 280/287; 74/551.3
(58) Field of Classification Search .................. 280/276, 280/278, 279, 287, 288.4; 74/551.3, 551.4, 74/551.7
See application file for complete search history.

(56) References Cited

U.S. PATENT DOCUMENTS

| | | | | |
|---|---|---|---|---|
| 4,462,606 A * | 7/1984 | Hon | ............................... | 280/278 |
| 5,337,609 A * | 8/1994 | Hsu | ............................... | 74/551.3 |
| 5,440,948 A * | 8/1995 | Cheng | .......................... | 74/551.3 |
| 5,492,350 A * | 2/1996 | Pan | ............................... | 280/278 |
| 5,906,452 A * | 5/1999 | Lee | ............................... | 403/325 |
| 6,196,566 B1 * | 3/2001 | Zhang | .......................... | 280/287 |
| 6,581,492 B1 * | 6/2003 | Chen | ........................... | 74/551.3 |
| 6,641,159 B1 * | 11/2003 | Fan | ............................... | 280/278 |
| 6,880,848 B2 * | 4/2005 | Liu | ............................... | 280/287 |
| 6,941,835 B2 * | 9/2005 | Ying | ........................... | 74/551.3 |
| 2008/0169624 A1 * | 7/2008 | Hon | ............................... | 280/278 |

* cited by examiner

Primary Examiner — James Kramer
Assistant Examiner — Marc A Scharich
(74) Attorney, Agent, or Firm — Rajesh Vallabh; Foley Hoag LLP

(57) ABSTRACT

A foldable device is adapted to connect a front fork to a handlebar of a bicycle, and includes a linking member hingedly connected to lower and upper hingeable flanges about first and second hinge axes, respectively. The first and second hinge axes are transverse to each other. The upper and lower hingeable flanges are respectively coupled with the handlebar and the front fork. The handlebar is turned relative to the front fork about the first and second hinge axes to permit a handlebar line of the handlebar to be parallel to a longitudinal direction in which the bicycle extends so as to fold the bicycle and to minimize the entire width of the folded bicycle.

17 Claims, 10 Drawing Sheets

FOLDABLE DEVICE FOR CONNECTING A FRONT FORK TO A HANDLEBAR OF A BICYCLE

CROSS-REFERENCE TO RELATED APPLICATION

This application claims priority of Taiwanese patent Application No. 098104671, filed on Feb. 13, 2009, the disclosure of which is herein incorporated by reference.

BACKGROUND OF THE INVENTION

1. Field of the Invention

This invention relates to a foldable bicycle, more particularly to a foldable device for connecting a front fork to a handlebar of a foldable bicycle.

2. Description of the Related Art

Referring to FIGS. 1 and 2, a conventional foldable bicycle 7 disclosed in Taiwanese Utility Model No. 265310 is shown to include a bicycle frame 71, a front fork 72 which has a steering tube 721 extending in a head tube of the bicycle frame 71, a front wheel 73, a stem 74 which is coupled to the steering tube 721 via a folding device 6, and a handlebar 75 connected to an upper end of the stem 74. The folding device 6 includes an extension 61 and a connecting unit 62. When a locking block 621 is released to permit disengagement between upper and lower portions 622, 623, the stem 74 can be turned toward the left side of the bicycle frame 71 about a pivot 624 to permit the elongated line of the handlebar 75 to extend in an upright direction, and can then be turned toward the bicycle frame 71 to be locked by a C-shaped clamp 711, whereby the bicycle 7 is held in a folded state.

Since the front wheel 73 is brought to turn with the stem 74 during folding of the bicycle 7, the entire width of the folded bicycle 7 is relatively large, and a wheel with a large diameter is therefore not suitable for use in the bicycle 7.

SUMMARY OF THE INVENTION

The object of the present invention is to provide a foldable device which is used to connect a front fork to a handlebar of a foldable bicycle, and which permits wheel axes of two bicycle wheels to be in line with each other when the bicycle frame is in a folded state so as to minimize the entire width of the folded bicycle.

According to this invention, the foldable device includes a lower hingeable flange, a linking member, an upper stem, an upper hingeable flange, and a clamping unit.

The lower hingeable flange is adapted to be coupled with a top end of a front fork of the bicycle, and has a bottom major surface, and lower hingeable and clampable segments.

The linking member includes a central region which defines a centerline that is parallel to a steering axis of the top end when a handlebar of a bicycle is in a position of use, a first engaging region which is hingedly connected to the lower hingeable segment about a first hinge axis to permit the linking member to move between a first closed position, where the central region is close to the bottom major surface, and a first open position, where the central region is remote from the bottom major surface, and a second engaging region which is angularly displaced from the first engaging region about the centerline.

The upper stem defines a lengthwise line that is parallel to the steering axis when the handlebar is in the position of use, and is adapted to be coupled with the handlebar.

The upper hingeable flange is connected to and extends from the upper stem, and has an overlying major surface which faces toward the bottom major surface when the handlebar is in the position of use, an upper hingeable segment which is hingedly connected to the second engaging region about a second hinge axis that is transverse to the first hinge axis to permit the upper hingeable flange to move between a second closed position, where the overlying major surface is close to the central region, and a second open position, where the overlying major surface is remote from the central region, and an upper clampable segment that is angularly displaced from the upper hingeable segment about the lengthwise line.

The clamping unit is disposed to hold the upper and lower clampable segments tightly once the linking member and the upper hingeable flange are in the first and second closed positions, respectively.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Figure 1:
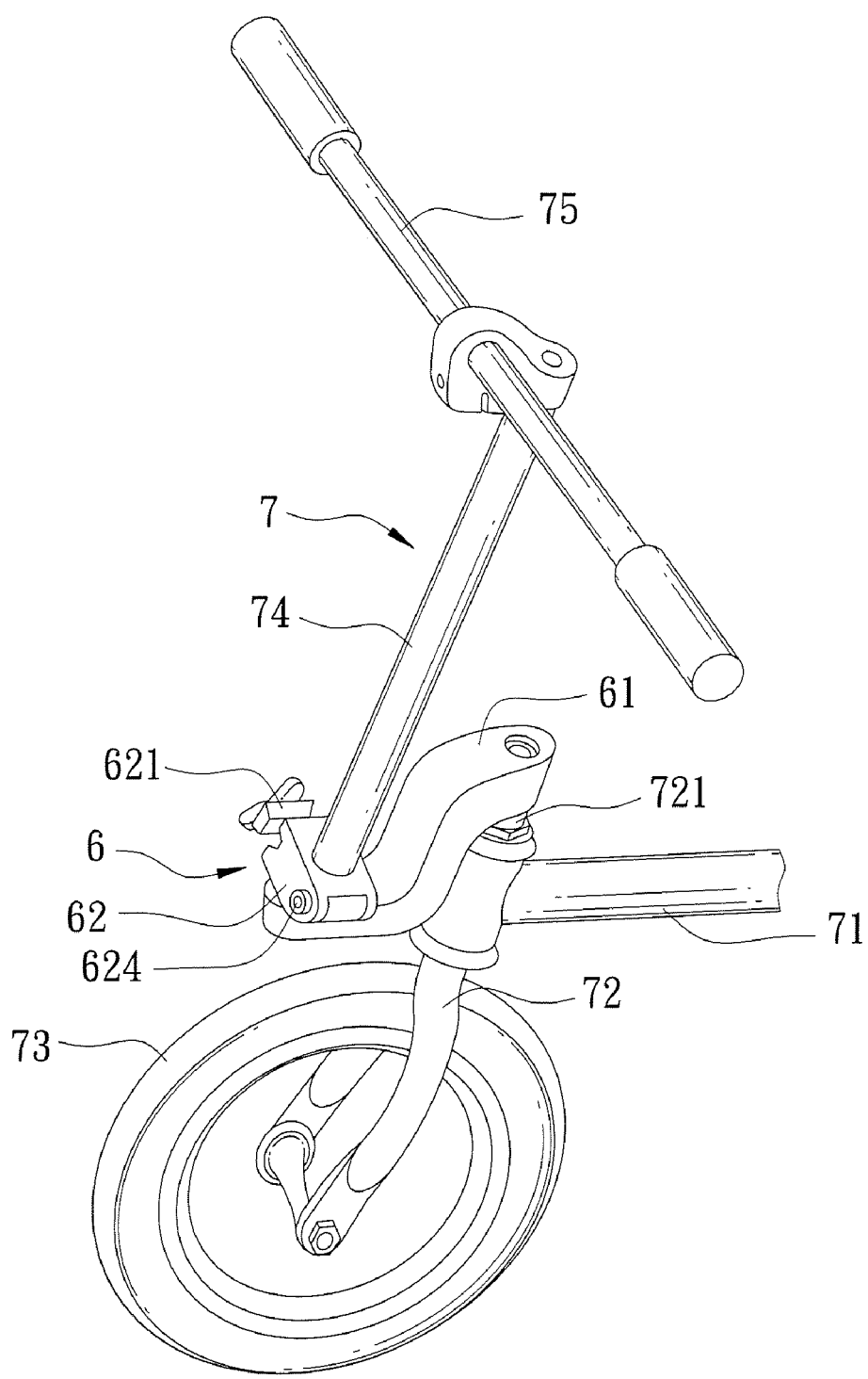
FIG. 1 is a perspective view of a conventional foldable device for connecting a front fork to a handlebar of a foldable bicycle.
Figure 2:
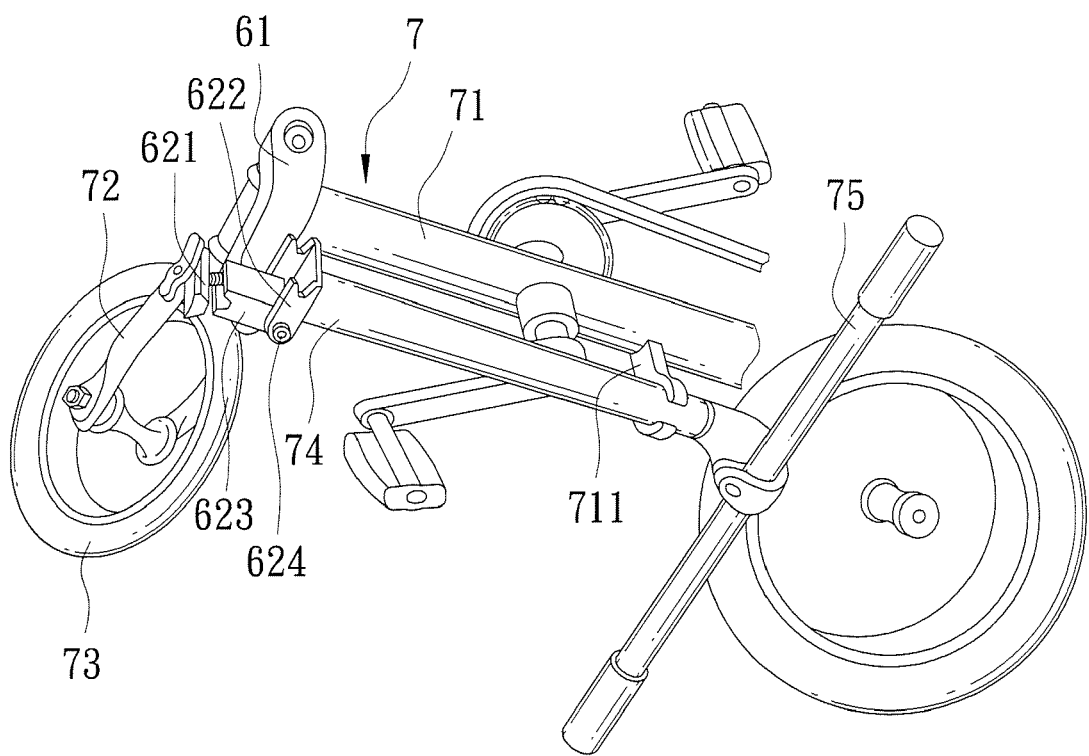
FIG. 2 is a perspective view of the conventional foldable bicycle in a folded state.
Figure 3:
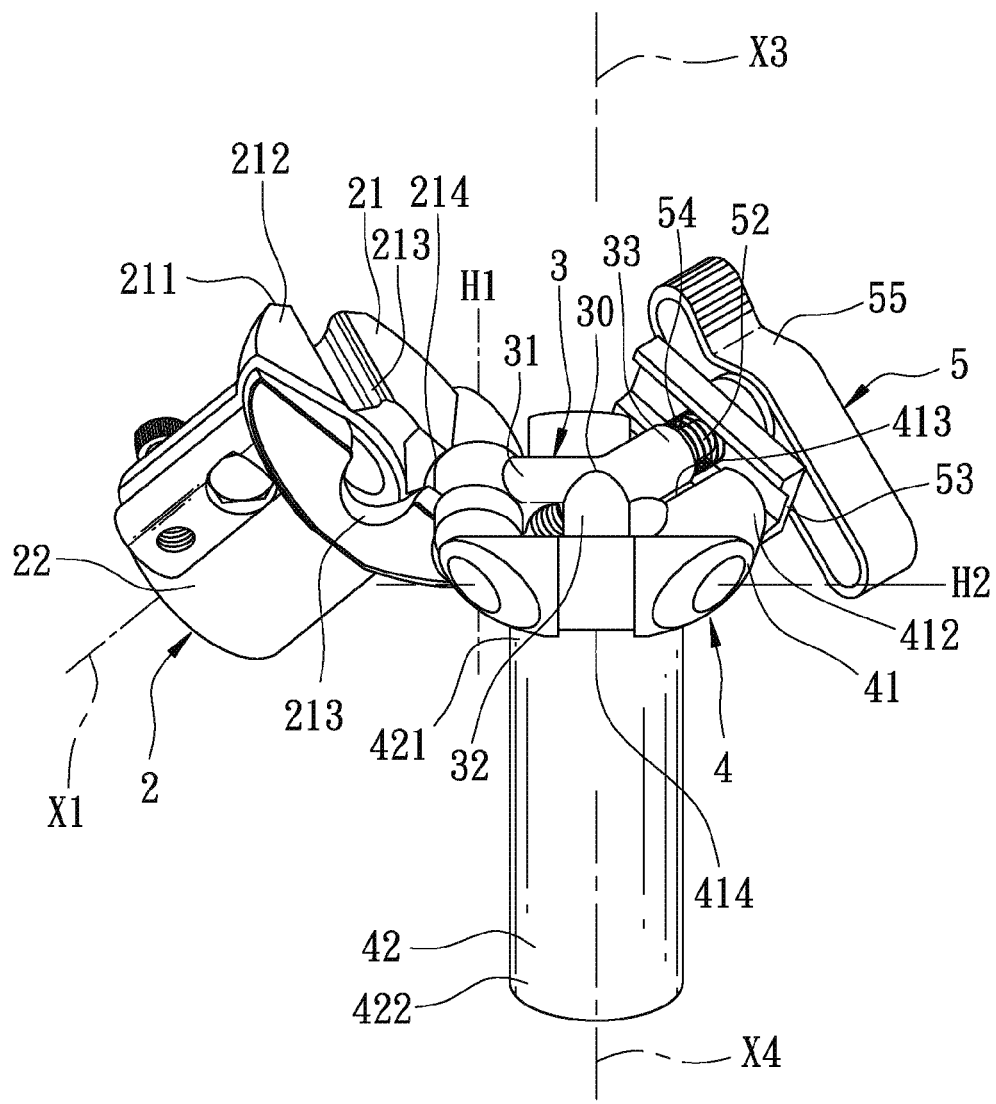
FIG. 3 is a perspective view of the first preferred embodiment of a foldable device according to this invention in a first open state.

Before the present invention is described in greater detail, it should be noted that same reference numerals have been used to denote like elements throughout the specification.

Referring to FIGS. 3 to 6, the first preferred embodiment of a foldable device according to the present invention is adapted to connect a front fork 13 of a bicycle to a handlebar 11 of a bicycle frame 1. The bicycle frame 1 extends in a longitudinal direction, and has a head tube 12 such that the front fork 13 is received in the head tube 12 and extends along a steering axis (X1) in an upright direction to terminate at a top end 131. The handlebar 11 has a central portion 110, and two handlebar ends 111 at opposite sides of the central portion 110 and along a handlebar line (X2).

The foldable device is shown to comprise a fork-side unit 2, a linking member 3, a handlebar-side unit 4, and a clamping unit 5.

The fork-side unit 2 includes a connecting member 22 and a lower hingeable flange 21 which is integrally formed with the connecting member 22.

The connecting member 22 includes a hoop 220 which is fitted around the top end 131 of the front fork 13 about the steering axis (X1) and which has two opposing ends that are spaced apart from each other by a gap 221, two lugs 222 which extend respectively and radially from the ends of the hoop 220, and two screw fasteners 224 which are disposed to tighten the lugs 222 toward each other, thereby retaining the connecting member 22 tightly on the top end 131 of the front fork 13.

The lower hingeable flange 21 extends upwardly and radially from the connecting member 22 relative to the steering axis (X1), and has a bottom major surface 212 that faces upwardly. The lower hingeable flange 21 includes lower hingeable and clampable segments 214,211 that are angularly displaced from each other about the steering axis (X1). In this embodiment, the hingeable segment 214 is a cavity formed in the bottom major surface 212, and the clampable segment 211 is a cutaway surface adjacent to the bottom major surface 212. Additionally, a plurality of cavities 213 are formed in the bottom major surface 212.

Figure 4:
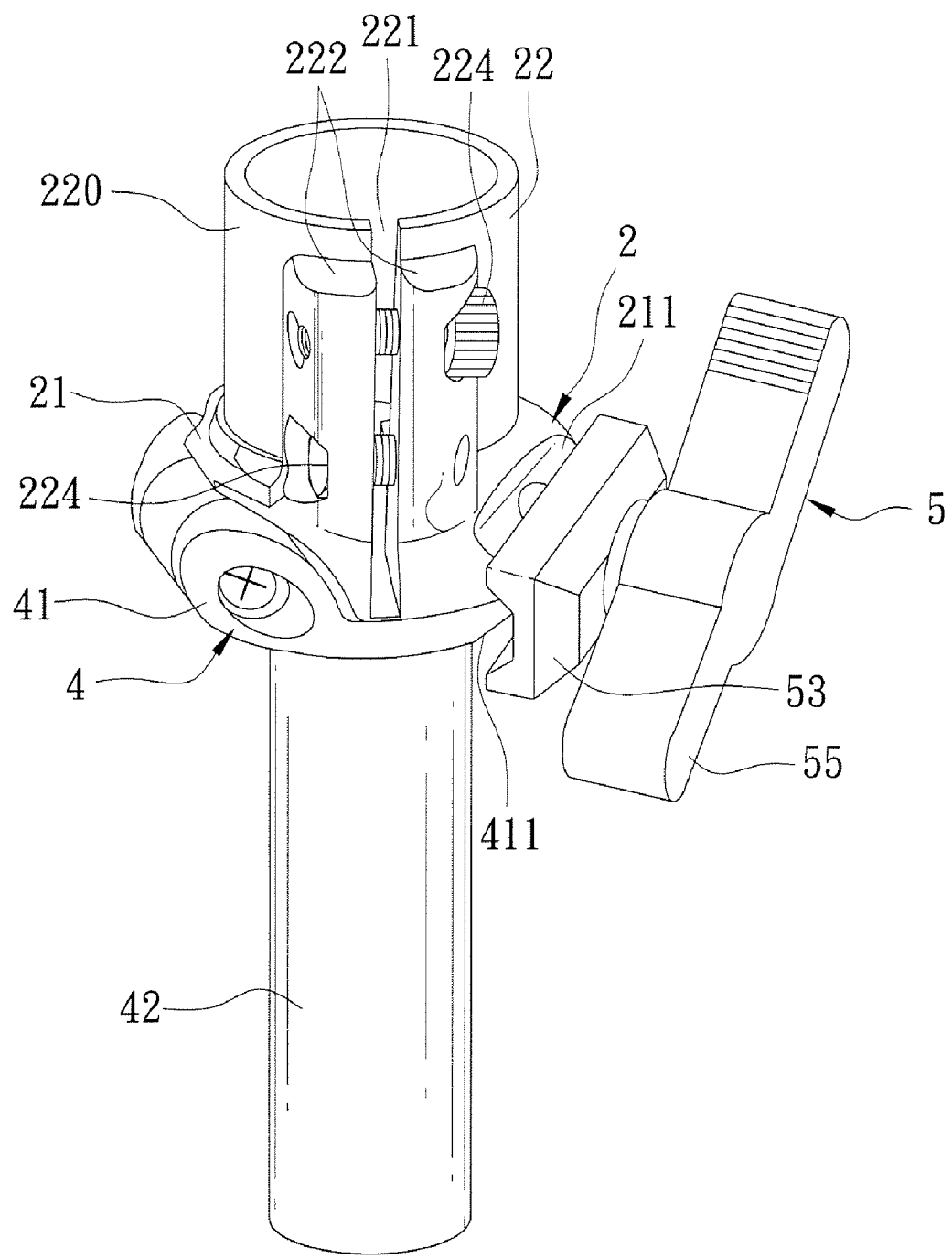
FIG. 4 is a perspective view of the first preferred embodiment in a state of use.
Figure 5:
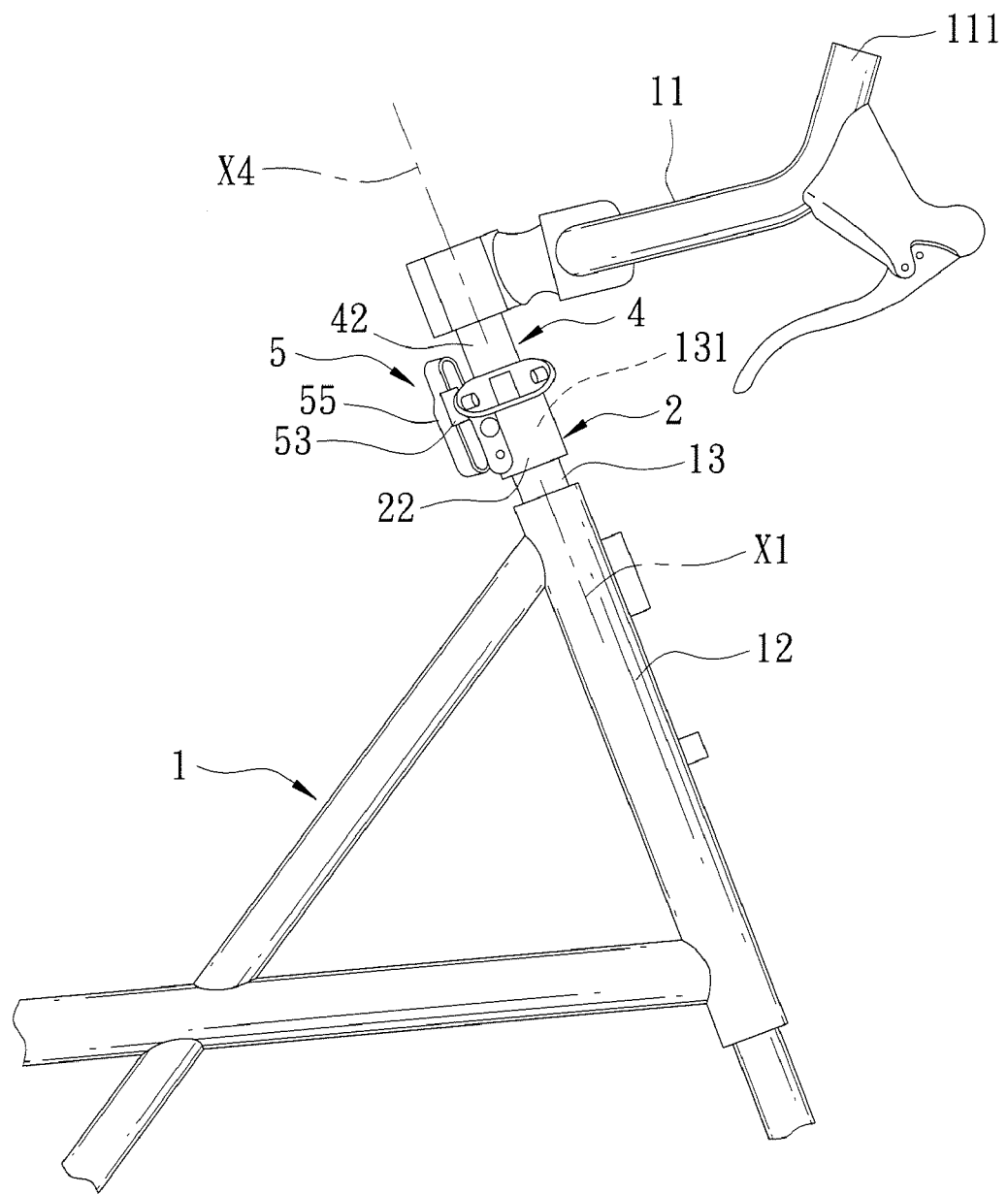
FIG. 5 is a schematic side view of the first preferred embodiment when incorporated in a bicycle.

The linking member 3 defines a centerline (X3) that is parallel to the steering axis (X1) when the handlebar 11 is in a position of use (as shown in FIG. 4), and includes a central region 30 normal to the centerline (X3), a first engaging region 31 which is opposite to the central region 30 radially relative to the centerline (X3), and which is hingedly connected to the lower hingeable segment 214 about a first hinge axis (H1) that is transverse to the longitudinal and upright directions to permit the linking member 3 to move between a first closed position, where the central region 30 is close to the bottom major surface 212, and a first open position (see FIG. 3), where the central region 30 is remote from the bottom major surface 212, and second and third engaging regions 32,33 which are angularly displaced from the first engaging region 31 about the centerline (X3).

The handlebar-side unit 4 includes an upper stem 42 and an upper hingeable flange 41 which is integrally formed with the upper stem 42.

The upper stem 42 defines a lengthwise line (X4) that is parallel to the steering axis (X1) when the handlebar 11 is in the position of use, and has an upper connected end 421 and an upper coupling end 422 that is opposite to the upper connected end 421 and that is adapted to be coupled with the central portion 110 of the handlebar 11.

The upper hingeable flange 41 is connected to and extends from the upper connected end 421 radially relative to the lengthwise line (X4). The upper hingeable flange 41 has an overlying major surface 412 which faces toward the bottom major surface 212 when the handlebar 11 is in the position of use. The upper hingeable flange 41 includes an upper hingeable segment 414 hingedly connected to the second engaging region 32 about a second hinge axis (H2) (see FIG. 7) that is transverse to the first hinge axis (H1) to permit the upper hingeable flange 41 to move between a second closed position, where the overlying major surface 412 is close to the central region 30, and a second open position, where the overlying major surface 412 is remote from the central region 30. The upper hingeable flange 41 further includes an upper clampable segment 411 that is angularly displaced from the upper hingeable segment 414 about the lengthwise line (X4). In this embodiment, the upper hingeable segment 414 is a cavity formed in the overlying major surface 412, and the upper clampable segment 411 is a cutaway surface adjacent to the overlying major surface 412. Additionally, a plurality of cavities 413 are formed in the overlying major surface 412, and mate with the cavities 213 in the bottom major surface 212 to define an accommodation space therebetween, such that the overlying major surface 412 is partially superimposed upon the bottom major surface 212, and the linking member 3 is received in the accommodation space when the linking member 3 is in the first closed position.

The clamping unit 5 includes a tightening bolt 52 which has a threaded segment engaged with the third engaging region 33 of the linking member 3, and an enlarged head 55 opposite to the threaded segment, and a jaw member 53 which is movably sleeved on the tightening bolt 52. When the linking member 3 and the upper hingeable flange 41 are respectively in the first and second closed positions, i.e., when the handlebar 11 is in the position of use, by manually operating the enlarged head 55, the jaw member 53 can be brought to move toward the steering axis (X1) to tightly hold the upper and lower clampable segments 411,211 by virtue of engagement of the threaded segment of the tightening bolt 52 with the linking member 3. In addition, a biasing member 54 is disposed between the linking member 3 and the jaw member 53 to bias the jaw member 53 away from the steering axis (X1).

Figure 6:
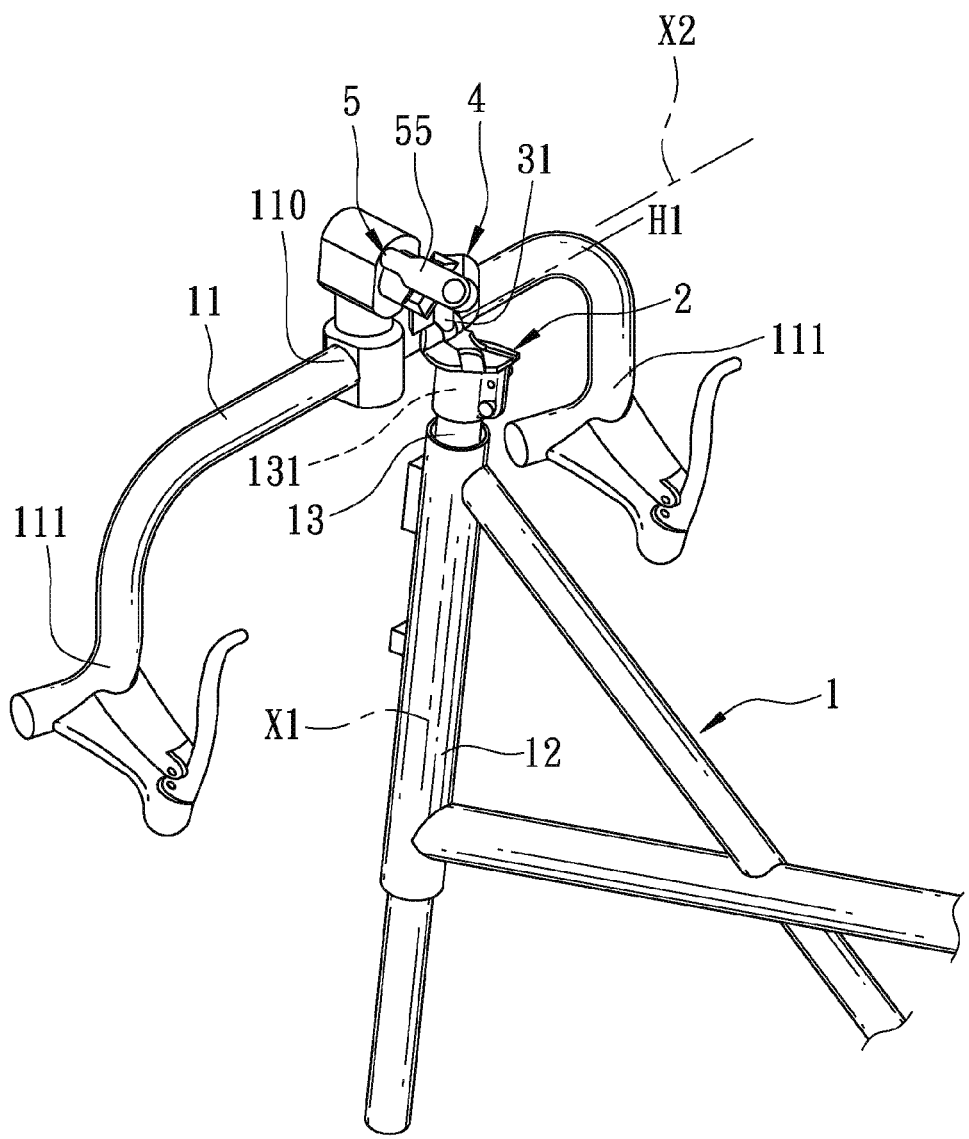
FIG. 6 is a perspective view of the first preferred embodiment in the first open state.
Figure 7:
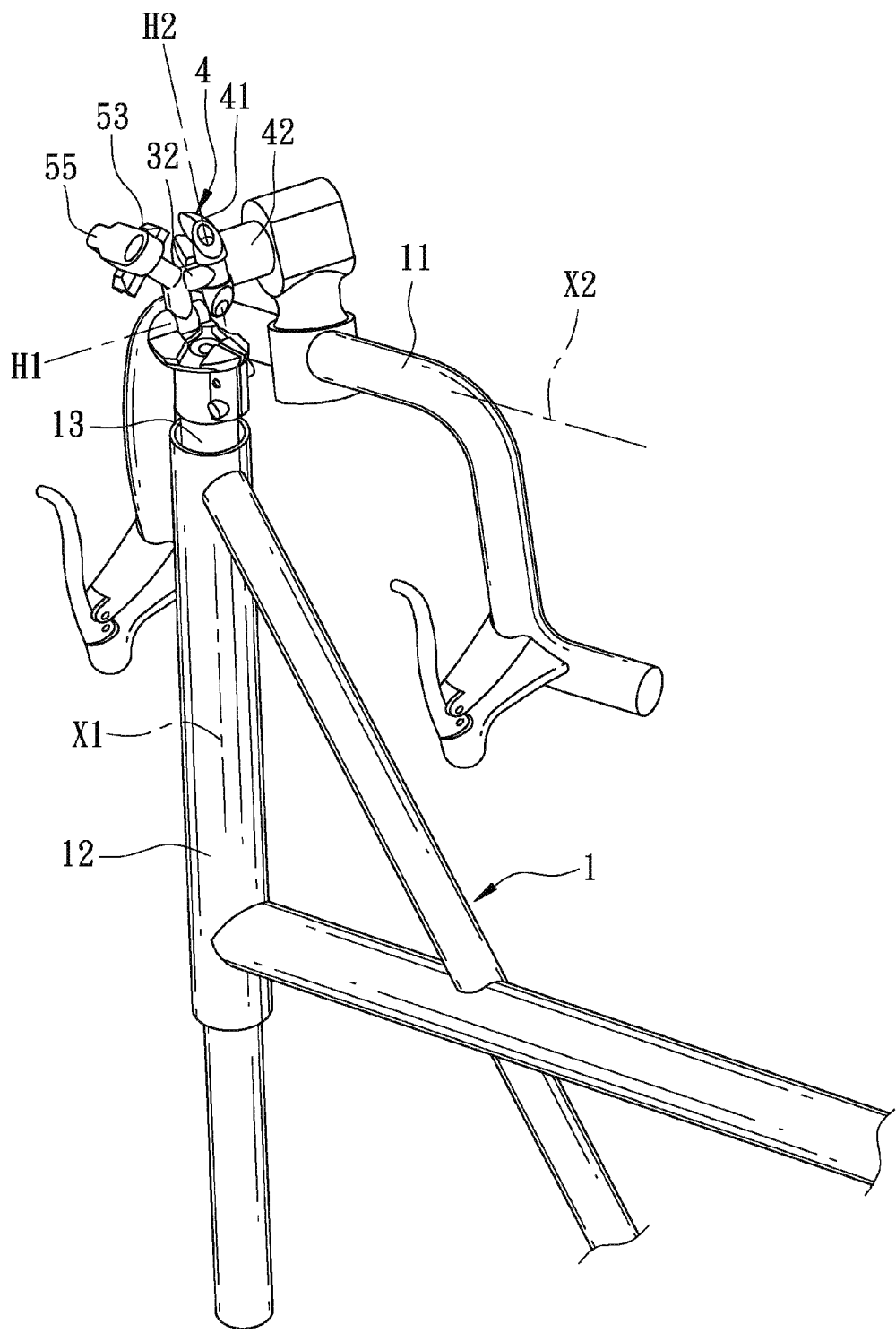
FIG. 7 is a perspective view of the first preferred embodiment in a second open state.

When it is desired to fold the bicycle frame 1, the enlarged head 55 is turned to permit disengagement of the jaw member 53 from the upper and lower clampable segments 411, 211. The user can then grip the enlarged head 55 and turn the linking member 3 and the handlebar 11 about the first hinge axis (H1) so as to move the linking member 3 to the first open position, as shown in FIG. 6. At this stage, the handlebar line (X2) is transverse to the longitudinal direction in which the bicycle frame 1 extends, and the second hinge axis (H2) extends in the upright direction. Subsequently, the user can turn the handlebar-side unit 4 and the handlebar 11 about the second hinge axis (H2) to move the upper hingeable flange 41 to the second open position, as shown in FIG. 7. At this stage, the second hinge axis (H2) extends in the upright direction, and the handlebar line (X2) is parallel to the longitudinal direction. Thus, axes of front and rear bicycle wheels (not shown) can be maintained in line with each other during folding of the bicycle frame 1, thereby minimizing the entire width of the folded bicycle.

Figure 8:
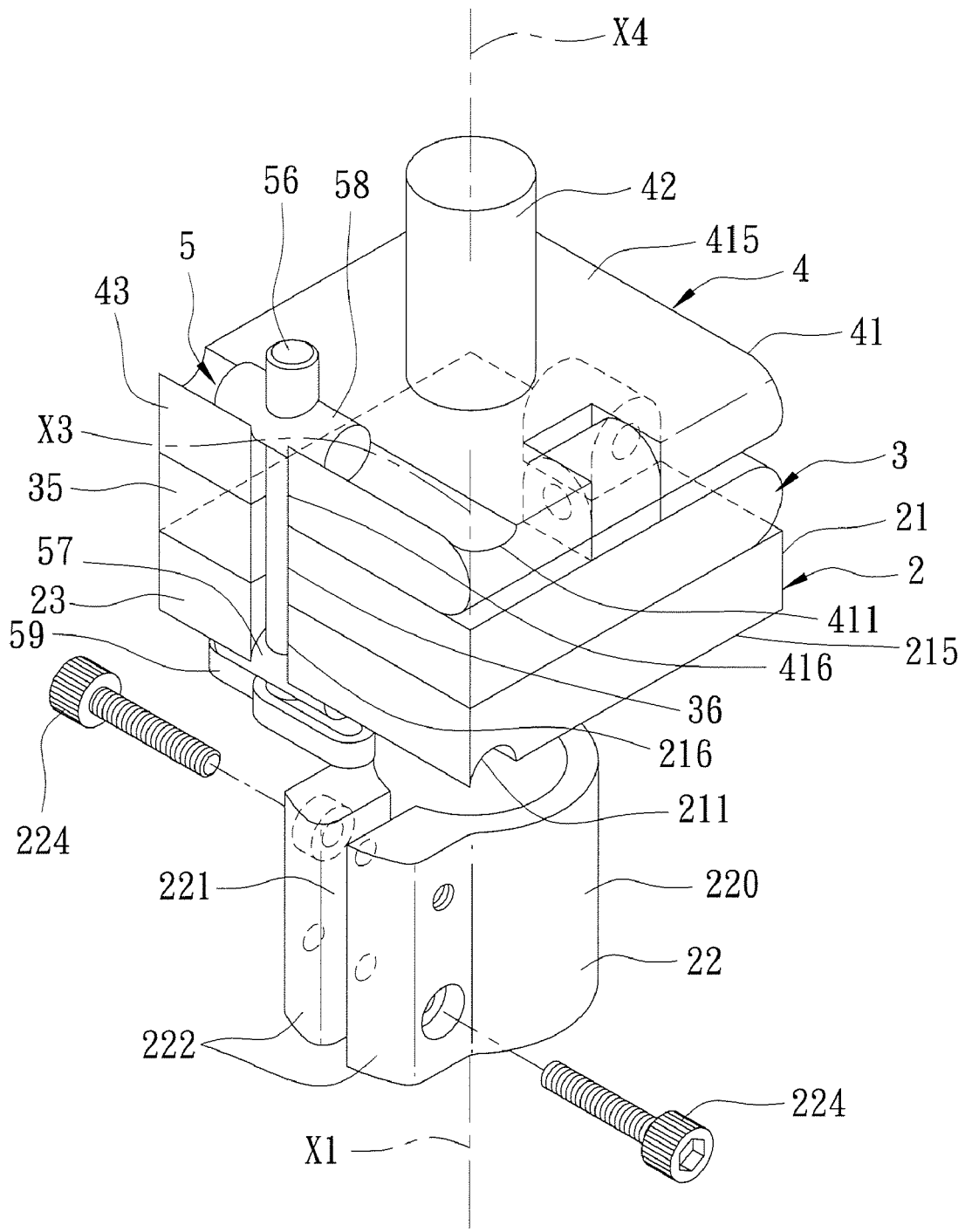
FIG. 8 is a perspective view of the second preferred embodiment of a foldable device according to this invention.
Figure 9:
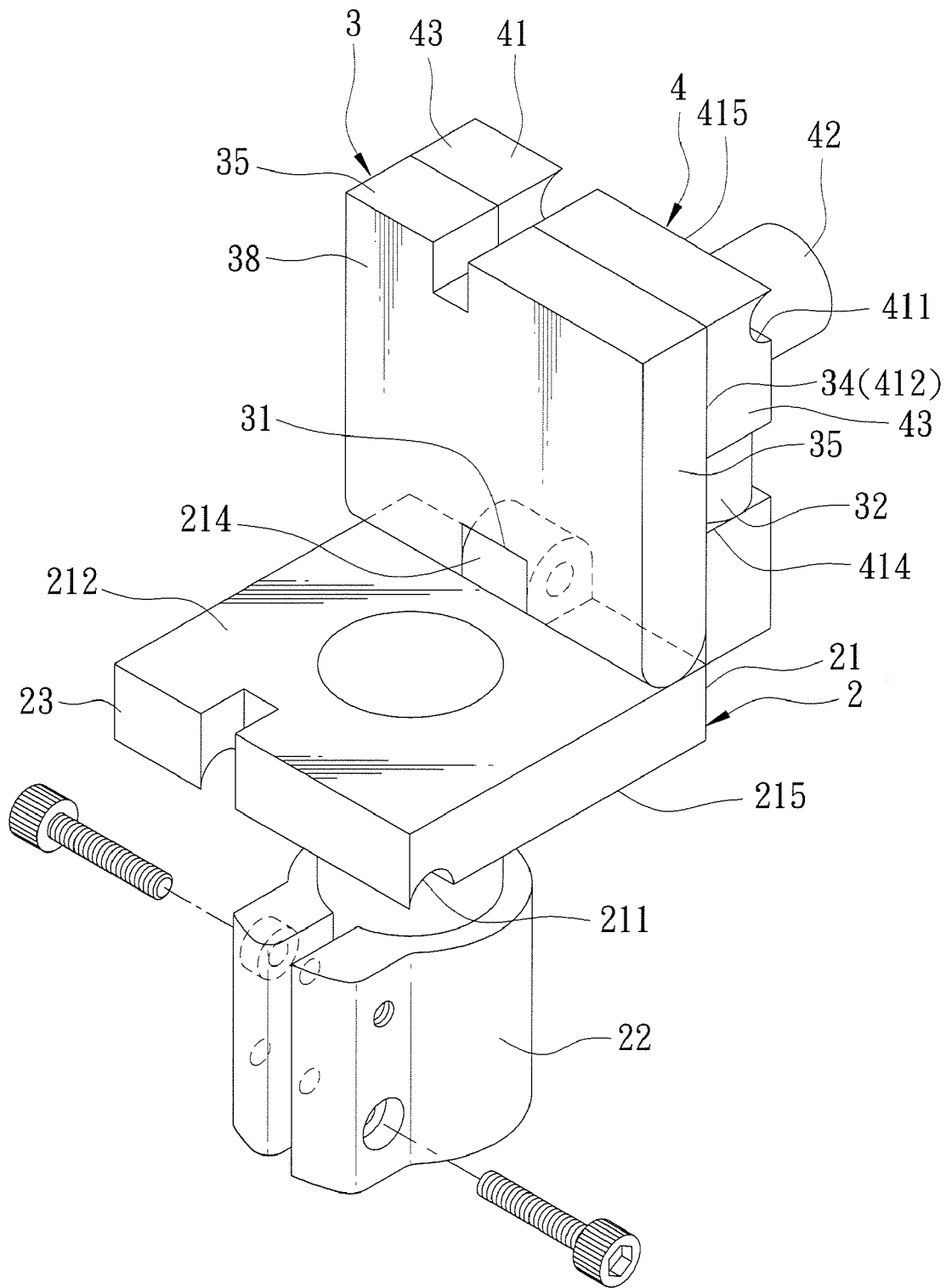
FIG. 9 is a perspective view of the second preferred embodiment in a first open state.
Figure 10:
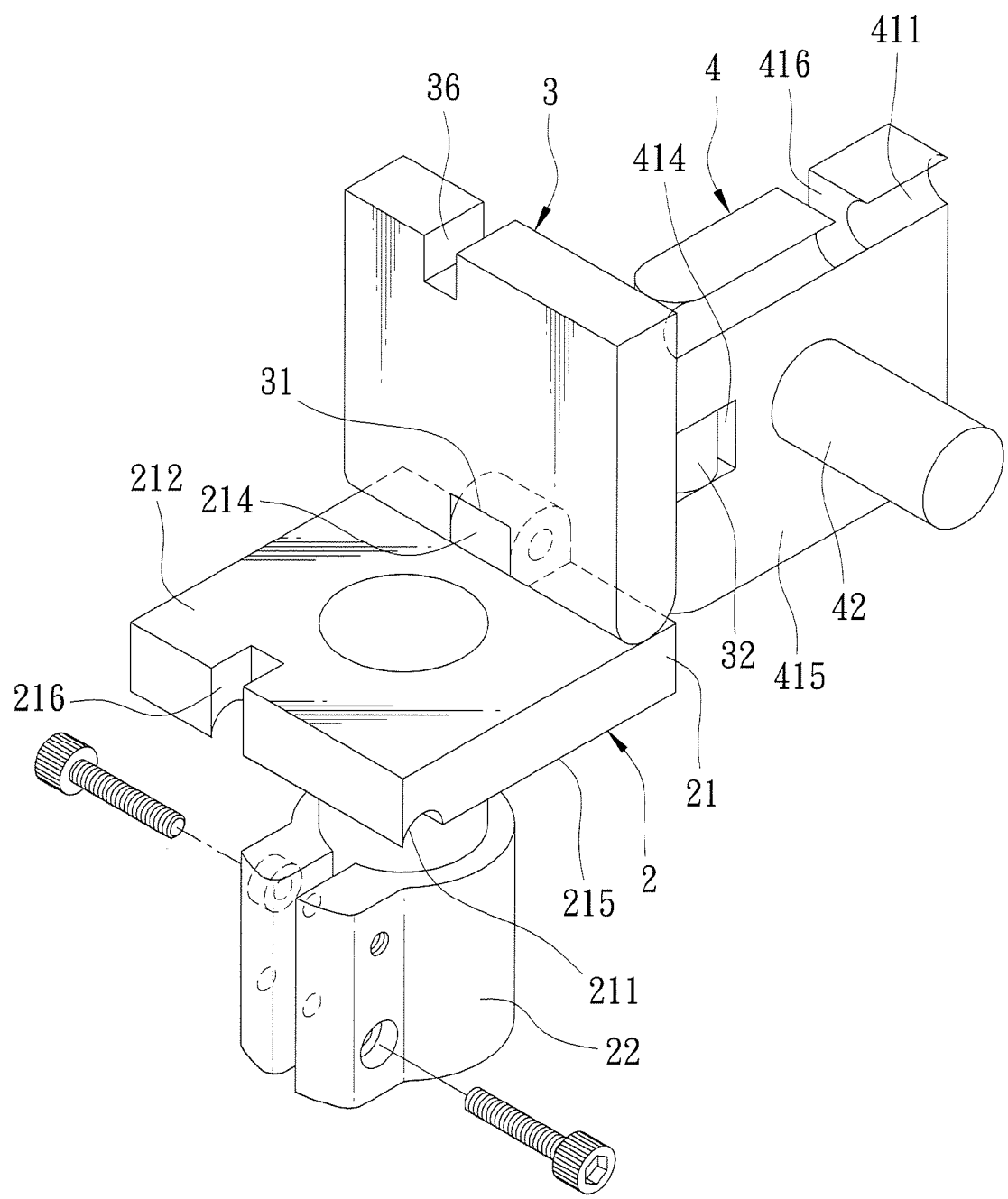
FIG. 10 is a perspective view of the second preferred embodiment in a second open state.

Referring to FIGS. 8 to 10, the second preferred embodiment of a foldable device according to this invention is shown to be similar to the first preferred embodiment in construction. In this embodiment, the upper and lower hingeable flanges 41,21 and the linking member 3 are in the form of blocks. The linking member 3 has upper and lower major surfaces 34,38 that are opposite to each other along the centerline (X3) and that are disposed to be sandwiched between the bottom and overlying major surfaces 212,412 when the handlebar (not shown) is in a position of use (as shown in FIG. 8), and a middle peripheral surface 35 that interconnects the upper and lower major surfaces 34,38 and that surrounds the centerline (X3). Additionally, the upper and lower hingeable flanges 41,21 respectively have upper and lower clamped major surfaces 415,215 that are respectively opposite to the overlying and bottom major surfaces 412,212. The upper and lower hingeable flanges 41,21 further have upper and lower peripheral surfaces 43,23, respectively, which are flush with the middle peripheral surface 35 when the handlebar is in the position of use.

Additionally, the lower hingeable segment 214 of the lower hingeable flange 21 is in the form of a lug which extends upwardly from the bottom major surface 212. The first engaging region 31 of the linking member 3 is concaved from the middle peripheral surface 35 toward the centerline (X3), and is mated and hinged to the lower hingeable segment 214. The second engaging region 32 of the linking member 3 is in the form of a lug which extends in a direction parallel to the centerline (X3) from the upper major surface 34. The upper hingeable segment 414 of the upper hingeable flange 41 is concaved from the upper peripheral surface 43 toward the lengthwise line (X4), and is mated and hinged to the second engaging region 32.

Additionally, the linking member 3 and the upper and lower hingeable flanges 41,21 respectively have concavities 36,416,216 which are concaved from the middle, upper and lower peripheral surfaces 35,43,23, respectively, and which are aligned with one another when the handlebar is in the position of use. The upper and lower clampable segments 411,211 are concaved from the upper and lower clamped major surfaces 415,215, respectively. The clamping unit 5 includes an insert bolt 56 which is insertable into the concavities 36,416,216, and upper and lower abutting portions 57,58 which are engaged with the upper and lower clampable segments 411,211, respectively. The lower abutting portion 57 is sleeved on the insert bolt 56. The upper abutting portion 58 is threadedly engaged with the insert bolt 56. The insert bolt 56 has an enlarged head 59 which is operable manually such that screw-in movement of the insert bolt 56 results in movement of the upper abutting portion 58 so as to press the upper clamped major surface 415 toward the lower clamped major surface 215.

While the present invention has been described in connection with what are considered the most practical and preferred embodiments, it is understood that this invention is not limited to the disclosed embodiments but is intended to cover various arrangements included within the spirit and scope of the broadest interpretations and equivalent arrangements.

I claim:

1. A foldable device for connecting a front fork to a handlebar of a bicycle, the bicycle including a bicycle frame which has a head tube, the front fork being received in the head tube and extending along a steering axis in an upright direction to terminate at a top end of the front fork, the handlebar extending along a handlebar line, said foldable device comprising:
   a lower hingeable flange adapted to be coupled with the top end, and extending radially relative to the steering axis, said lower hingeable flange having a bottom major surface that faces upwardly, and including a lower hingeable segment and a lower clampable segment that are angularly displaced from each other about the steering axis;
   a linking member defining a centerline that is parallel to the steering axis when the handlebar is in a position of use, and including
      a central region which is normal to the centerline,
      a first engaging region which is opposite to said central region radially relative to the centerline, and which is hingedly connected to said lower hingeable segment about a first hinge axis to permit said linking member to move between a first closed position, where said central region is close to said bottom major surface, and a first open position, where said central region is remote from said bottom major surface, and
      a second engaging region which is angularly displaced from said first engaging region about the centerline;
   an upper stem which defines a lengthwise line that is parallel to the steering axis when the handlebar is in the position of use, and which has a connected end and a coupling end that is adapted to be coupled with the handlebar;
   an upper hingeable flange which is connected to and which extends from said connected end of said upper stem radially relative to the lengthwise line, said upper hingeable flange having an overlying major surface which faces toward said bottom major surface when the handlebar is in the position of use, said upper hingeable flange including
      an upper hingeable segment which is hingedly connected to said second engaging region about a second hinge axis that is transverse to the first hinge axis to permit said upper hingeable flange to move between a second closed position, where said overlying major surface is close to said central region, and a second open position, where said overlying major surface is remote from said central region, and
      an upper clampable segment that is angularly displaced from said upper hingeable segment about the lengthwise line; and
   a clamping unit disposed to hold said upper and lower clampable segments tightly once said linking member and said upper hingeable flange are in the first and second closed positions, respectively.

2. The foldable device according to claim 1, wherein the bicycle frame extends in a longitudinal direction, and the first and second hinge axes are disposed such that the handlebar line is transverse to the longitudinal direction when said linking member is turned to the first open position, and is parallel to the longitudinal direction when said upper hingeable flange is turned to the second open position.

3. The foldable device according to claim 2, wherein the first hinge axis extends transverse to the upright and longitudinal directions, and the second hinge axis is disposed to extend in the upright direction when said upper hingeable flange is in the second open position.

4. The foldable device according to claim 3, further comprising a connecting member which extends downwardly from said lower hingeable flange along the steering axis, and which is adapted to be secured to the top end of the front fork.

5. The foldable device according to claim 4, wherein said connecting member includes a hoop which is fitted around the top end of the front fork about the steering axis and which has two opposing ends that are spaced apart from each other by a gap, two lugs which extend respectively and radially from said ends of said hoop, and a screw fastener which is disposed to tighten said lugs toward each other, thereby retaining said connecting member tightly on the top end of the front fork.

6. The foldable device according to claim 5, wherein said hoop is integrally formed with said lower hingeable flange, and said upper stem is integrally formed with said upper hingeable flange.

7. The foldable device according to claim 1, wherein said clamping unit includes a jaw member which is brought to move toward the steering axis to tightly hold said upper and lower clampable segments, and a tightening bolt which has a threaded segment engaged with said linking member, and an enlarged head that is opposite to said threaded segment, and that is manually operable to move said jaw member toward the steering axis by virtue of engagement of said threaded segment with said linking member.

8. The foldable device according to claim 7, further comprising a biasing member which is disposed between said linking member and said jaw member to bias said jaw member away from the steering axis.

9. The foldable device according to claim 1, wherein said bottom and overlying major surfaces are configured such that said overlying major surface is partially superimposed upon said bottom major surface when said linking member is in the first closed position, and cooperatively define an accommodation space therebetween for receiving said linking member.

10. The foldable device according to claim 1, wherein said linking member is in the form of a block which has upper and lower major surfaces that are opposite to each other along the centerline and that are disposed to be sandwiched between said bottom and overlying major surfaces when the handlebar is in the position of use, and a middle peripheral surface that interconnects said upper and lower major surfaces and that surrounds the centerline, said upper and lower hingeable flanges respectively having upper and lower clamped major surfaces that are respectively opposite to said overlying and bottom major surfaces, and upper and lower peripheral surfaces that are flush with said middle peripheral surface when the handlebar is in the position of use.

11. The foldable device according to claim 10, wherein said lower hingeable segment extends upwardly from said bottom major surface, said first engaging region being concaved from said middle peripheral surface toward the centerline and being mated and hinged to said lower hingeable segment, said second engaging region extending in a direction parallel to the centerline from said upper major surface, said upper hingeable segment being concaved from said upper peripheral surface toward the lengthwise line and being mated and hinged to said second engaging region.

12. The foldable device according to claim 11, wherein said linking member and said upper and lower clampable segments respectively have concavities which are concaved from said middle, upper and lower peripheral surfaces, respectively, and which are aligned with one another when the handlebar is in the position of use, said clamping unit including an insert bolt which is insertable into said concavities, and upper and lower abutting portions which abut against said upper and lower clampable segments, respectively.

13. The foldable device according to claim 12, wherein said upper and lower clampable segments are respectively concaved from said upper and lower clamped major surfaces, and respectively engage said upper and lower abutting portions, said lower abutting portion being sleeved on said insert bolt, said upper abutting portion being threadedly engaged with said insert bolt so as to press said upper clamped major surface toward said lower clamped major surface by virtue of screw-in movement of said insert bolt.

14. A foldable device for connecting a front fork to a handlebar of a bicycle, the front fork extending in a bicycle frame of the bicycle, the handlebar including two handlebar ends disposed opposite to each other along a handlebar line, said foldable device comprising:
 a fork-side unit adapted to be coupled with the front fork;
 a linking member including a first engaging region rotatably connected to said fork-side unit, and a second engaging region spaced apart from said first engaging region;
 a handlebar-side unit which is adapted to be coupled with the handlebar and which is rotatably connected to said second engaging region such that said handlebar-side unit is movable between closed and open positions relative to said linking member; and
 a clamping unit which is disposed to hold said fork-side unit and said handlebar-side unit when said handlebar-side unit is in the closed position so as to tightly retain said linking member between said fork-side unit and said handlebar-side unit,
 wherein said handlebar-side unit is disposed such that, in the closed position, said handlebar-side unit cooperates with said fork-side unit to retain said linking member, and the handlebar line extends transverse to a longitudinal direction that the bicycle frame extends, and such that, in the open position, said first engaging region is permitted to be turned relative to said fork-side unit, and said handlebar-side unit is turned relative to said second engaging region so that the handlebar line extends parallel to the longitudinal direction.

15. The foldable device according to claim 14, wherein said second engaging region is angularly displaced from said first engaging region.

16. The foldable device according to claim 15, wherein said handlebar-side unit is disposed such that, in the open position, said first engaging region is permitted to be turned relative to said fork-side unit about a first hinge axis that is transverse to the longitudinal direction, and the handlebar-side unit is turned relative to said second engaging region about a second hinge axis that is transverse to the first hinge axis so that the handlebar line extends parallel to the longitudinal direction.

17. The foldable device according to claim 16, wherein said first engaging region is hingedly connected to said fork-side unit about the first hinge axis, and said handlebar-side unit is hingedly connected to said second engaging region about the second hinge axis.

* * * * *